US006592944B1

(12) United States Patent
Uhlianuk et al.

(10) Patent No.: US 6,592,944 B1
(45) Date of Patent: Jul. 15, 2003

(54) HIGH SOLIDS ACID ETCH AND MAR RESISTANT CLEAR COATING COMPOSITION

(75) Inventors: Peter William Uhlianuk, Romer, MI (US); John David Nordstrom, Huntington Woods, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/913,223

(22) PCT Filed: Mar. 16, 2000

(86) PCT No.: PCT/US00/06961

§ 371 (c)(1),
(2), (4) Date: Aug. 8, 2001

(87) PCT Pub. No.: WO00/55270

PCT Pub. Date: Sep. 21, 2000

Related U.S. Application Data

(60) Provisional application No. 60/183,185, filed on Feb. 17, 2000, and provisional application No. 60/124,850, filed on Mar. 17, 1999.

(51) Int. Cl.[7] .................................................. B05D 3/02
(52) U.S. Cl. .................... 427/385.5; 525/456; 525/509; 528/45; 528/58; 528/73; 528/80
(58) Field of Search ................................. 525/509, 456; 528/73, 80, 45, 58; 427/385.5, 409

(56) References Cited

U.S. PATENT DOCUMENTS

| | | |
|---|---|---|
| 3,928,299 A | 12/1975 | Rosenkranz et al. |
| 3,954,900 A | 5/1976 | Schmalz et al. |
| 4,064,110 A | 12/1977 | Arlt et al. |
| 4,315,091 A | 2/1982 | Steinberger et al. |
| 4,403,086 A | 9/1983 | Holubka et al. |
| 4,440,937 A | 4/1984 | Krimm et al. |
| 4,499,150 A | 2/1985 | Dowbenko et al. |
| 4,533,716 A | 8/1985 | Okoshi et al. |
| 4,632,964 A | 12/1986 | Altschuler et al. |
| 4,760,108 A | 7/1988 | Asano et al. |
| 4,772,666 A | 9/1988 | Just et al. |
| 4,820,830 A | 4/1989 | Blank |
| 4,849,480 A | 7/1989 | Antonelli et al. |
| 4,960,828 A | 10/1990 | Higuchi et al. |
| 5,010,140 A | 4/1991 | Antonelli et al. |
| 5,051,473 A | 9/1991 | Tabuchi et al. |
| 5,059,670 A | 10/1991 | Harris |
| 5,169,719 A | 12/1992 | Balatan |
| 5,182,174 A | 1/1993 | Stephenson |
| 5,230,962 A | 7/1993 | Stephenson |
| 5,279,862 A | 1/1994 | Corcoran et al. |
| 5,281,443 A | 1/1994 | Briggs et al. |
| 5,336,566 A | 8/1994 | Rehfuss |
| 5,349,041 A * | 9/1994 | Blum et al. ............... 528/85 |
| 5,356,669 A | 10/1994 | Rehfuss |
| 5,373,069 A | 12/1994 | Rehfuss et al. |
| 5,446,110 A | 8/1995 | Nakano et al. |
| 5,510,443 A | 4/1996 | Shaffer et al. |
| 5,512,639 A | 4/1996 | Rehfuss et al. |
| 5,516,559 A * | 5/1996 | Rockrath et al. ........ 427/407.1 |
| 5,646,213 A | 7/1997 | Guo |
| 5,665,433 A | 9/1997 | Moussa et al. |
| 5,684,084 A | 11/1997 | Lewin et al. |
| 5,719,237 A | 2/1998 | Rehfuss et al. |
| 5,726,246 A | 3/1998 | Rehfuss et al. |
| 5,744,550 A | 4/1998 | Menovcik et al. |
| 5,747,590 A | 5/1998 | Corcoran et al. |

(List continued on next page.)

FOREIGN PATENT DOCUMENTS

| | | |
|---|---|---|
| DE | 4124688 A1 | 1/1993 |
| DE | 19529124 | 11/1996 |
| EP | 0017187 A1 | 10/1980 |
| EP | 0135741 B1 | 4/1985 |
| EP | 0179281 A1 | 4/1986 |
| EP | 0257848 A2 | 3/1988 |
| EP | 0272664 A2 | 6/1988 |
| EP | 0562577 | 9/1993 |
| EP | 0708159 A2 | 4/1996 |
| FR | 2265828 A | 10/1975 |
| FR | 2392090 | 12/1978 |
| JP | 05271608 A | 10/1993 |
| JP | 06256714 | 9/1994 |
| JP | 07233348 | 9/1995 |
| JP | 10045867 | 2/1998 |
| WO | 9625466 A1 | 8/1996 |
| WO | WO 9634905 A | 11/1996 |
| WO | WO 9722647 A1 | 6/1997 |
| WO | WO 9827134 A1 | 6/1998 |
| WO | WO 9919411 A | 4/1999 |

OTHER PUBLICATIONS

Chapter 3, pp. 48–61, entitled Uses and Abuses of Photon Correlation Spectroscopy in Particle Sizing by Weiner et al. 1987 edition of American Chemical Society Symposium series.

Yasushi Nakate, Sep. 6, 1978, High–Solid Urethane Coating Compositions, JP53 102332 Translation (XP–002143021, 6001 Chemical Abstract vol. 90 (1979) No. 2, pp. 78).

Ntsihlele et al, 1995, Journal of Applied Polymer Science, Cross–Linked Coatings by Co–Reaction of Isocyanate–Methoxymethyl Melamine System, vol. 55, No. 2, pp. 153–161.

*Primary Examiner*—Erma Cameron
(74) *Attorney, Agent, or Firm*—Sudhir G. Deshmukh

(57) ABSTRACT

The present invention provides for an etch and mar resistant low VOC clear coating composition most suitable for use as a top clear coat in multi-layered OEM or refinish automotive coatings. The coating composition includes polyisocyanate, polyester polyol and melamine components, where more than half of total composition solids include the polyester polyol and melamine components. The polyisocyanate component includes an aliphatic polyisocyanate. The composition may be formulated as a two-pack or one-pack coating composition, wherein the isocyanate functionalities are blocked with a blocker such as a mono-alcohol.

26 Claims, No Drawings

U.S. PATENT DOCUMENTS

| | | |
|---|---|---|
| 5,760,127 A | 6/1998 | Bammel et al. |
| 5,763,528 A | 6/1998 | Barsotti et al. |
| 5,837,795 A | 11/1998 | Lomoelder et al. |
| 5,853,809 A | 12/1998 | Campbell et al. |
| 5,872,195 A | 2/1999 | Green et al. |
| 5,886,125 A | 3/1999 | Huybrechts |
| 5,891,981 A | 4/1999 | Mauer et al. |
| 5,965,272 A | 10/1999 | Donnelly et al. |
| 5,987,727 A * | 11/1999 | Shafik et al. .............. 29/527.2 |
| 6,013,326 A | 1/2000 | Flosbach et al. |
| 6,143,367 A | 11/2000 | Bartol et al. |
| 6,221,494 B1 | 4/2001 | Barsotti et al. |
| 2001/0036985 A1 * | 11/2001 | Lee et al. ................... 524/261 |

* cited by examiner

HIGH SOLIDS ACID ETCH AND MAR RESISTANT CLEAR COATING COMPOSITION

CROSS-REFERENCE TO PARENT APPLICATIONS

This application is a 35 U.S.C. §371 of PCT/US00/06961 filed on Mar. 16, 2000, which claims benefit of provisional Application Ser. Nos. 60/124,850, filed Mar. 17, 1999 and Ser. No. 60/183,185, filed Feb. 17, 2000.

BACKGROUND OF THE INVENTION

The present invention generally relates to high solids, low VOC (volatile organic component) coating compositions and more particularly to low VOC clear coating compositions suited for multi-layered coatings used in automotive OEM and refinish applications.

Basecoat-clearcoat systems have found wide acceptance in the automotive finishes market. Continuing effort has been directed to improve the overall appearance, the clarity of the topcoat, and the resistance to deterioration of these coating systems at ever-higher application solids levels. Further effort has also been directed to the development of coating compositions having low VOC. A continuing need still exists for clear coating formulations having an outstanding balance of performance characteristics after application, particularly etch and mar resistance at high solids levels and low coating application viscosity. Melamine/acrylic polyol crosslinked or melamine self-condensed coatings for example, may provide coatings having acceptable mar but such coatings have poor acid etch resistance and decreased appearance at higher solids level. On the other hand, isocyanate/acrylic polyol based 2 K urethane coatings generally provide acceptable acid-etch resistance but such coatings have poor mar resistance. Therefore, a need still exists for coatings that not only provide acceptable mar and acid-etch resistance but also high gloss and DOI at the lowest VOC possible.

One approach described by Ntsihlele and Pizzi in an article titled "Cross-Linked Coatings by Co-Reaction of Isocyanate-Methoxymethyl Melamine Systems" (Journal of Applied Polymer Science, Volume 55, Pages 153–161-1995) provides for reacting aromatic diisocyanate with methoxymethyl melamine. However, a need still exists for a high solids clear coating composition, which upon a long-term exposure to sunlight does not yellow or become brittle and provides low coating application viscosities.

Another approach is disclosed in FR-A-2 265 828 provides for heat hardenable compositions suitable for coating metal objects. The composition includes a finely divided solid isocyanated polyester resin having masked isocyanate groups dispersed in a reactive liquid of highly etherized metylolated aminotriazine.

STATEMENT OF THE INVENTION

The present invention is directed to a clear coating composition comprising a polyester polyol a polyisocyanate and a melamine component wherein the total amount of said polyisocyanate and melamine components range from 50 percent to 90 percent, said percentages being in weight percentage based on the total weight of composition solids and wherein said polyisocyanate component comprises an aliphatic polyisocyanate having on an average 2 to 6 isocyanate functionalities.

The present invention is also directed to a method of producing a clear coating on a substrate comprising:

applying a layer of a clear coating composition comprising a polyester polyol, a polyisocyanate and a melamine component wherein the total amount of said polyisocyanate and melamine components range from 50 percent to 90 percent, said percentages being in weight percentage based on the total weight of composition solids and wherein said polyisocyanate component comprises an aliphatic polyisocyanate having on an average 2 to 6 isocyanate functionalities; and curing said layer into said clear coating.

One of the advantages of the present invention is its low VOC, which is below the current guidelines of Environment Protection Agency (EPA) of the United States.

Another advantage is the mar and etch resistance and hardness of the coating resulting from the coating composition of the present invention.

Yet another advantage is the clarity and high gloss of the coating resulting from the coating composition of the present invention.

As Used Herein:

"Two-pack coating composition" means a thermoset coating composition comprising two components stored in separate containers. These containers are typically sealed to increase the shelf life of the components of the coating composition. The components are mixed prior to use to form a pot mix. The pot mix has a limited pot life typically of minutes (15 minutes to 45 minutes) to a few hours (4 hours to 6 hours). The pot mix is applied as a layer of desired thickness on a substrate surface, such as an autobody. After application, the layer is cured under ambient conditions or bake cured at elevated temperatures to form a coating on the substrate surface having desired coating properties, such as high gloss, mar-resistance and resistance to environmental etching. "One-pack coating composition" means a thermoset coating composition comprising two components that are stored in the same container. However, one component is blocked to prevent premature crosslinking. After the application of the one-pack coating composition on a substrate, the layer is typically exposed to elevated temperatures to unmask the blocked component. Thereafter, the layer is bake-cured at elevated temperatures to form a coating on the substrate surface having desired coating properties, such as high gloss, mar-resistance and resistance to environmental etching.

"Low VOC coating composition" means a coating composition that includes in the range of from 0 to 0.472 kilogram of organic solvent per liter (4 pounds per gallon), preferable in the range of from 0.118 (1 pound per gallon) to 0.295 kilogram of organic solvent per liter (2.5 pounds per gallon) of the composition, as determined under the procedure provided in ASTM D3960.

"High solids composition" means a coating composition having a solid component in the range of from 65 to 100 percent and preferably greater than 70 percent, all in weight percentages based on the total weight of the composition.

"Clear coating composition" means a clear coating composition that produces upon cure, a clear coating having DOI (distinctness of image) rating of more than 80 and 20° gloss rating of more than 80.

"GPC weight average molecular weight" and "GPC number average molecular weight" means a weight average molecular weight and a weight average molecular weight, respectively measured by utilizing gel permeation chromatography. A high performance liquid chromatograph (HPLC) supplied by Hewlett-Packard; Palo Alto, Calif. was used. Unless stated otherwise, the liquid phase used was tetrahydrofuran and the standard was polystyrene.

"Polymer particle size" means the diameter of the polymer particles measured by using a Brookhaven Model BI-90 Particle Sizer supplied by Brookhaven Instruments Corporation, Holtsville, N.Y. The sizer employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. 1987 edition of American Chemical Society Symposium series.

"Polymer solids" or "composition solids" means a polymer or composition in its dry state.

"Aliphatic" as employed herein includes aliphatic and cycloaliphatic materials.

"Crosslinkable" means that the individual components of a composition contain functionalities, which react within the composition of the invention to give a coating of good appearance, durability, hardness and mar resistance.

"Acid etch resistance" refers to the resistance provided by a coated surface against chemical etching action by the environment, such as for example acid rain.

"Mar resistance" refers to the resistance provided by coating to mechanical abrasions, such as, for example, the abrasion of a coated surface, such as an automotive body, that typically occurs during washing and cleaning of the coated surface.

Applicants have unexpectedly discovered that contrary to conventional approaches used in typical thermoset coating compositions, i.e., those involving polymers and crosslinking components, a very viable route lies in a combination of what would traditionally be considered as crosslinking agents for producing a unique low VOC high solids clear coating composition that produces coatings having superior coating properties, such as clarity, and mar and etch resistance.

When a coating composition of polyisocyanate and melamine formulated with more than 50 weight percent based on total composition solids of melamine is employed, etch resistance drops rapidly. The durability based on accelerated weathering also suffers. It is believed, without reliance thereon, that the higher weight percentage of melamine in the coating composition leads to self-condensed melamine, which in turn adversely affects the coating durability.

On the other hand, if one were to formulate a clear coating composition with more than 55 weight percent based on total composition solids of polyisocyanate, such as isocyanurate of hexamethyl diisocyanate, mar resistance of the resultant coatings suffers. Other aliphatic isocyanates, such as the trimers of isophorone diisocyanate, used at these levels would also be unsatisfactory as such high levels would lead to higher coating application viscosities, which in turn would require higher solvent loading. As a result, the VOC of the composition will be unacceptably high. Thus a need exists to provide a low VOC coating composition that not only has good mar and itch resistance but it also has low coating application viscosity.

Applicants have unexpectedly discovered that by substantially increasing the total amount of polyisocyanate and melamine components in a coating composition, provided neither component is more than about half of the total composition solids, results in a low VOC clear coating composition having improved mar and etch resistance coupled with low application viscosity so long as a polyester polyol is also included. Low molecular weight polyester polyols are preferred as even lower coating application viscosities can be obtained. Moreover, the foregoing combination also does not adversely affect other important coating properties, such as gloss, DOI, and other desired coating properties.

The clear coating composition of the present invention includes a polyester polyol, a polyisocyanate and a melamine components wherein the total amount of the polyisocyanate and melamine components ranges from 50 percent to 90 percent, preferably 60 to 80 weight percent and more preferably 65 to 75 weight percent, all the percentages being in weight percentage based on the total weight of composition solids.

The polyisocyanate component includes an aliphatic polyisocyanate having on an average 2 to 6, preferably 2.5 to 6 and more preferably 3 to 4 isocyanate functionalities. The coating composition includes in the range of from 25 percent to 55 percent, preferably in the range of from 30 percent to 50 percent, and most preferably in the range of 35 percent to 45 percent of the polyisocyanate component, the percentages being in weight percentages based on the total weight of composition solids.

Examples of suitable aliphatic polyisocyanates include aliphatic or cycloaliphatic di-, tri- or tetra-isocyanates, including polyisocyanates having isocyanurate structural units such as, the isocyanurate of hexamethylene diisocyanate and isocyanurate of isophorone diisocyanate; the adduct of 2 molecules of a diisocyanate, such as hexamethylene diisocyanate; uretidiones of examethylene diisocyanate; uretidiones of isophorone diisocyanate or sophorone diisocyanate; isocyanurate of meta-tetramethylxylylene diisocyanate; and a diol such as, ethylene glycol, the adduct of 3 molecules of hexamethylene diisocyanate and 1 molecule of water (available under the trademark Desmodur® N of Bayer Corporation, Pittsburgh, Pa.). Low molecular weight (400 to 1500 GPC number average molecular weight) adduct of the diisocyanates with monomeric polyols, such as trimethylol propane are also suitable polyisocyanates.

Aromatic polyisocyanates are not suitable for use in the present invention as the clear coatings resulting therefrom are too light sensitive and tend to yellow with age and crack upon long term exposure to sunlight. As a result such clear coatings are not durable.

If desired, the isocyanate functionalities of the polyisocyanate may be capped with a monomeric alcohol to prevent premature crosslinking in a one-pack composition. Some suitable monomeric alcohols include methanol, ethanol, propanol, butanol, isopropanol, isobutanol, hexanol, 2-ethylhexanol and cyclohexanol.

The coating composition includes in the range of from 10 percent to 40 percent, preferably in the range of from 20 percent to 40 percent, and most preferably in the range of from 25 percent to 35 percent of the melamine component, the percentages being in weight percentages based on the total weight of composition solids. The melamine component of the coating composition includes suitable monomeric or polymeric melamines or a combination thereof. Alkoxy monomeric melamines are preferred.

In the context of the present invention, the term "alkoxy monomeric melamine" means a low molecular weight melamine which contains, on an average three or more methylol groups etherized with a $C_1$ to $_5$ monohydric alcohol such as methanol, n-butanol, or isobutanol per triazine nucleus, and has an average degree of condensation up to about 2 and preferably in the range of about 1.1 to about 1.8, and has a proportion of mononuclear species not less than about 50 percent by weight. The polymeric melamines have an average degree of condensation of more than 1.9.

Some of such suitable monomeric melamines include highly alkylated melamines, such as methylated, butylated, isobutylated melamines and mixtures thereof. More particularly hexamethylol melamine, trimethylol melamine, partially methylated hexamethylol melamine, and pentamethoxymethyl melamine are preferred. Hexamethylol melamine and partially methylated hexamethylol melamine are more preferred and hexamethylol melamine is most preferred.

Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327 and 370, which are all monomeric melamines. Suitable polymeric melamines include high amino (partially alkylated, —N, —H) melamine known as Resimene™ m BMP5503 (molecular weight 690, polydispersity of 1.98, 56% buytl, 44% amino), which is supplied by Solutia Inc., St. Louis, Mo., or Cymel® 1158 provided by Cytec Industries Inc., West Patterson, N.J.

Cytec Industries Inc. also supplies Cymel® 1130 @ 80 percent solids (degree of polymerization of 2.5), Cymel® 1133 (48% methyl, 4% methylol and 48% butyl), both of which are polymeric melamines.

The coating composition preferably includes one or more catalysts to enhance crosslinking of the components on curing. Generally, the coating composition includes in the range of from 0.1 percent to 5 percent, preferably in the range of from 0.1 to 2 percent, more preferably in the range of from 0.5 percent to 2 percent and most preferably in the range of from 0.5 percent to 1.2 percent of the catalyst, the percentages being in weight percentages based on the total weight of the polyester polyol, polyisocyanate and melamine components.

Some of the suitable catalysts include the conventional acid catalysts, such as aromatic sulfonic acids, for example dodecylbenzene sulfonic acid, para-toluenesulfonic acid and dinonylnaphthalene sulfonic acid, all of which are either unblocked or blocked with an amine, such as dimethyl oxazolidine and 2-amino-2-methyl-1-propanol, n,n-dimethylethanolamine or a combination thereof. Other acid catalysts that can be used are strong acids, such as phosphoric acids, more particularly phenyl acid phosphate, which may be unblocked or blocked with an amine.

In addition to the foregoing, the coating composition preferably includes a small amount of one or more organo tin catalysts, such as dibutyl tin dilaurate, dibutyl tin diacetate, stannous octate, and dibutyl tin oxide. Dibutyl tin dilaurate is preferred. The amount of organo tin catalyst added generally ranges from 0.001 percent to 0.5 percent, preferably from 0.05 percent to 0.2 percent and more preferably from 0.1 percent to 0.15 percent, the percentages being in weight percentages based on the total weight of the polyester polyol, polyisocyanate and melamine components. These catalysts are preferably added to the melamine component.

The coating composition includes in the range of from 5 percent to 65 percent, preferably in the range of from 10 percent to 50 percent, and most preferably in the range of from of 20 percent to 40 percent of the polyester polyol component, the percentages being in weight percentages based on the total weight of composition solids.

The polyester polyol suitable for use in the polyester polyol component has a GPC weight average molecular weight not exceeding 3000, preferably in the range of from 400 to 3000, more preferably in the range of 600 to 2000, most preferably in the range of 800 to 1500. The polyester polyol has hydroxyl functionality in the range from 2.2 to 6, preferably 2.5 to 5 and more preferably in the range of from 2.8 to 4.0.

The polyester polyol suitable for use in the present invention may be conventionally polymerized from suitable polyacids, including cycloaliphatic polycarboxylic acids or anhydrides, and an excess amount of suitable polyol, including polyhydric alcohol, to provide the polyester with hydroxyl functionalities.

Examples of suitable cycloaliphatic polycarboxylic acids are tetrahydrophthalic acid (or anhydride), hexahydrophthalic acid (or anhydride), 1,2-cyclohexanedicarboxylic acid (or anhydride), 1,3-cyclohexanedicarboxylic acid, 1,4-cyclohexanedicarboxylic acid, 4-methylhexahydrophthalic acid (or anhydride), endomethylenetetrahydrophthalic acid, tricyclodecanedicarboxylic acid, endoethylenehexahydrophthalic acid, camphoric acid, cyclohexanetetracarboxylic acid, cyclobutanetetracarboxylic acid and combinations thereof. The cycloaliphatic polycarboxylic acids can be used not only in their cis but also in their trans form and as a mixture of both these forms. The preferred cycloaliphatic polycarboxylic acids are tetrahydrophthalic acid (or anhydride), hexahydrophthalic acid (or anhydride), 1,2-cyclohexanedicarboxylic acid (or anhydride), 1,4-cyclohexanedicarboxylic acid and 4-methylhexahydrophthalic acid (or anhydride).

Examples of suitable polycarboxylic acids, which, if desired, can be used together with the cycloaliphatic polycarboxylic acids (or anhydrides), are aromatic and aliphatic polycarboxylic acids, such as, for example, phthalic acid; isophthalic acid; terephthalic acid, halogenophthalic acids, such as, tetrachloro- or tetrabromophthalic acid; adipic acid; glutaric acid; azelaic acid; sebacic acid; fumaric acid; maleic acid; trimellitic acid and pyromellitic acid. The preferred polycarboxylic acids are phthalic acid and maleic acid. Generally, 0 to 25 weight percent, preferably 10 to 20 weight percent of polycarboxylic acid may be added to cycloaliphatic polycarboxylic acid (or anhydride), all weight percentages being based on the total weight of polycarboxylic acid and cycloaliphatic polycarboxylic acid (or anhydride).

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutyipropanediol, ditrimethylolpropane, trimethylolethane, trimethylolpropane, glycerol, pentaerythritol, dipentaerythritol, polyalkylene glycol, such as polyethylene glycol and polypropylene glycol. The preferred polyhydric alcohols are ditrimethylolpropane, trimethylolethane, trimethylolpropane and pentaerythritol.

A more preferred method of preparing the polyester polyol of the present invention is by first reacting a multifunctional alcohol, such as, pentaerythritol, hexandiol, or trimethyol propane with alicyclic monomeric anhydrides, for example, hexahydrophthalic anhydride or methyl-hexahydrophthalic anhydride to produce an oligomeric acid. Mixtures of the foregoing anhydrides may also be used. Non-alicyclic anhydrides, for example, succinic anhydride or phthalic anhydride could also be added to the alicyclic monomeric anhydrides. Oligomeric acids having at least one hydroxyl functionality are also suitable, which are prepared by reacting the multifunctional alcohol with less than a stochiometric amount of the monomeric anhydride.

The oligomeric acid is then reacted with a monofunctional epoxy to produce the polyester polyol. The oligomerization is generally carried out at a reaction temperature in the range of from 60° C. to 200° C. preferably in the range of from 80° C. to 170° C., and more preferably in the range of from 90° C. to 150° C. Typical reaction time is in the range of from 1 hours to 24 hours, preferably 1 hour to 4 hours.

The foregoing two-step process ensures that the hydroxyl functionalities are uniformly distributed on each oligomeric chain of the polyester polyol.

The monofunctional epoxy suitable for use in the present invention includes alkylene oxide of 2 to 12 carbon atoms such as ethylene, propylene and butylene oxides. Other epoxies, such as, Glydexx®N-10 glycidyl ester, supplied by Exxon Chemicals, Houston, Tex. may be used alone or in combination with other alkylene oxide monomers.

The coating composition of the present invention, which is formulated into high solids coating systems further contains at least one organic solvent typically selected from the group consisting of aromatic hydrocarbons, such as petroleum naphtha or xylenes: ketones, such as, methyl amyl ketone, methyl isobutyl ketone. methyl ethyl ketone or acetone; esters, such as, butyl acetate or hexyl acetate, and glycol ether esters, such as propylene glycol monomethyl ether acetate. The amount of organic solvent added depends upon the desired solids level as well as the desired amount of VOC of the composition. If desired, the organic solvent may be added to both components of the binder.

The coating composition of the present invention may also contain conventional additives, such as stabilizers, and rheology control agents, flow agents, and toughening agents. Such additional additives will, of course, depend on the intended use of the coating composition. Any additives that would adversely effect the clarity of the cured coating will not be included as the composition is used as a clear coating. The foregoing additives may be added to either component or both, depending upon the intended use of the coating composition.

The clear coating composition of the present invention may be supplied in the form of a two-pack coating composition in which the first-pack includes the polyisocyanate component and the second-pack includes the melamine component. Generally the first and the second pack are stored in separate containers and mixed before use. The containers are preferably sealed air tight to prevent degradation during storage. The mixing may be done, for example, in a mixing nozzle or in a container.

Alternatively, when the isocyanates functionalities of the polyisocyanate are blocked, both the components of the coating composition can be stored in the same container in the form of a one-pack coating composition.

The coating composition of the present invention optionally contains in the range of from 0.1 percent to 40 percent, preferably in the range of from 5 percent to 35 percent, and more preferably in the range of from 10 percent to 30 percent of a flow modifying resin, such as a non-aqueous dispersion (AND), all percentages being based on the total weight of composition solids. The weight average molecular weight of the flow modifying resin generally varies in the range of from 20,000 to 100,000, preferably in the range of from 25,000 to 80,000 and more preferably in the range from 30,000 to 50,000.

The non-aqueous dispersion-type resin is prepared by dispersion-polymerizing at least one vinyl monomer in the presence of a polymer dispersion stabilizer and an organic solvent. The polymer dispersion stabilizer may be any of the known stabilizers used commonly in the field of non-aqueous dispersions, and may include the following substances (1) through (9) as examples:

(1) A polyester macromer having about 1.0 polymerizable double bond within the molecule as obtainable upon addition of glycidyl acrylate or glycidyl methacrylate to an auto-condensation polyester of a hydroxy-containing fatty acid such as 12-hydroxystearic acid.

(2) A comb-type polymer prepared by copolymerizing the polyester macromer mentioned under (1) with methyl methacrylate and/or other (meth)acrylic ester or a vinyl monomer.

(3) A polymer obtainable by the steps of copolymerizing the polymer described under (2) with a small amount of glycidyl (meth)acrylate and, then, adding (meth)acrylic acid to the glycidyl groups thereof so as to introduce double bonds.

(4) A hydroxy-containing acrylic copolymer prepared by copolymerizing at least 20 percent by weight of (meth) acrylic ester of a monohydric alcohol containing 4 or more carbon atoms.

(5) An acrylic copolymer obtainable by producing at least 0.3 double bond per molecule based on its number average molecular weight, into the copolymer mentioned under (4). A method for introducing double bonds may, for example, comprise copolymerizing the acrylic polymer with a small amount of glycidyl (meth) acrylate and then adding (meth)acrylic acid to the glycidyl group.

(6) An alkylmelamine resin with a high tolerance to mineral spirit.

(7) An alkyd resin with an oil length not less than 15 percent and/or a resin obtainable by introducing polymerizable double bonds into the alkyd resin. A method of introducing double bonds may, for example, comprise addition reaction of glycidyl (meth)acrylate to the carboxyl groups in the alkyd resin.

(8) An oil-free polyester resin with a high tolerance to mineral spirit, an alkyd resin with an oil length less than 15 percent, and/or a resin obtainable by introducing double bonds into said alkyd resin.

(9) A cellulose acetate butyrate into which polymerizable double bonds have been introduced. An exemplary method of introducing double bonds comprises addition reaction of isocyanatoethyl methacrylate to cellulose acetate butyrate.

These dispersion stabilizers can be used alone or in combination.

Among the aforementioned dispersion stabilizers, preferred for the purposes of the invention are those which can be dissolved in comparatively low polar solvents, such as aliphatic hydrocarbons to assure the film performance requirements to some extent. As dispersion stabilizers which can meet such conditions, the acrylic copolymers mentioned under (4) and (5) are desirable in that they not only lend themselves well to adjustment of molecular weight, glass transition temperature, polarity (polymer SP value), hydroxyl value, acid value and other parameters but are excellent in weatherability. More desirable are acrylic copolymers containing an average of about 0.2 to about 1.2 polymerizable double bonds, per molecule, which are graft copolymerized with dispersed particles.

The non-aqueous dispersion-type resin used in accordance with this invention can be easily prepared by dispersion-polymerizing at least one vinyl monomer in the presence of the aforedescribed polymer dispersion stabilizer and an organic solvent, which mainly contains an aliphatic hydrocarbon. The dispersion stabilizer and the vinyl monomer are soluble in the organic solvent. However, the polymer particles formed by the vinyl monomer are not soluble in the solvent.

The monomer component forming the acrylic copolymer suitable as the polymer dispersion stabilizer and the vinyl monomer forming the dispersed particles may be virtually any radical-polymerizable unsaturated monomer. A variety of monomers can be utilized for the purpose. Typical examples of such monomers include the following.

(a) Esters of acrylic acid or methacrylic acid, such as for example, $C_{1-18}$ alkyl esters of acrylic or methacrylic acid, such as methyl acrylate, ethyl acrylate, propyl acrylate, isopropyl acrylate, butl acrylate, hexyl acrylate, octyl acrylate, lauryl acrylate, stearyl acrylate, methyl methacrylate, ethyl methacrylate, propyl methacrylate, isopropyl methacrylate, butyl methacrylate, hexyl methacrylate, octyl methacrylate, lauryl methacrylate, and stearyl methacrylate; glycidyl acrylate and glycidyl methacrylate; $C_{2-8}$ alkenyl esters of acrylic or methacrylic acid, such as allyl acrylate, and allyl methacrylate; $C_{2-8}$ hydroxyalkyl esters of acrylic or methacrylic acid, such as hydroxyethyl acrylate, hydroxyethyl methacrylate, hydroxypropyl acrylate, and hydroxypropyl methacrylate; and $C_{3-18}$ alkenyloxyalkyl esters or acrylic or methacrylic acid, such as allyloxyethyl acrylate, and allyloxyethyl methacrylate.

(b) Vinyl aromatic compounds, such as for example styrene, alpha-methylstyrene, vinyltoluene, p-chlorostyrene, and vinylpyridine.

(c) α, β-Ethylenically unsaturated acids, such as, for example, acrylic acid, methacrylic acid, itaconic acid and crotonic acid (d) Amides of acrylic or methacrylic acid, such as, for example, acrylamide, methacrylamide, n-butoxymethylacrylamide, N-methylolacrylamide, n-butoxymethylmethacrylamide, and N-methylolmethacrylamide.

(e) Others: for example, acrylonitrile, methacrylonitrile, methyl isopropenyl ketone, vinyl acetate, VeoVa monomer (product of Shell Chemicals, Co., Ltd.; mixed vinyl esters of a synthetic saturated monocarboxylic acid of highly branched structure containing ten carbon atoms), vinyl propionate, vinyl pivalate, isocyanatoethyl methacrylate, perfluorocyclohexyl (meth)acrylate, p-styrenesulfonamide, N-methyl-p-styrenesulfonamide, anf γ-methacryloyloxypropyl trimethoxy silane.

Among the monomers mentioned above, the following materials can be used with particular advantage for the preparation of the acrylic copolymer used as a dispersion stabilizer:

Mixed monomers based on comparatively long-chain, low-polar monomers, such as n-butyl methacrylate, 2-ethylhexyl methacrylate, dodecyl methacrylate, lauryl methacrylate, and stearyl methacrylate, supplemented as necessary with styrene, methyl (meth)acrylate, ethyl (meth) acrylate, 2-hydroxyethyl (meth)acrylate, propyl (meth) acrylate, and (meth)acrylic acid. The dispersion stabilizer may be one prepared by adding glycidyl (meth)acrylate or isocyanatoethyl methacrylate to a copolymer of the monomers for introduction of polymerizable double bonds.

The acrylic copolymer used as the dispersion stabilizer can be easily prepared using a radical polymerization initiator in accordance with the known solution polymerization process.

The number average molecular weight of the dispersion stabilizer is preferably in the range of about 1,000 to about 50,000 and, for still better results, about 3,000 to about 20,000.

Among the monomers mentioned above, particularly preferred vinyl monomers for the formation of the dispersed polymer particles predominantly contain comparatively high-polarity monomers, such as methyl (meth)acrylate, ethyl (meth)acrylate, n-butyl (meth)acrylate, and acrylonitrile, supplemented as necessary with (meth)-acrylic acid, and 2-hydroxyethyl (meth)acrylate. It is also possible to provide gel particles as cross-linked in molecules by copolymerizing a small amount of polyfunctional monomers, such as divinylbenzene, and ethylene glycol dimethacrylate, by copolymerizing a plurality of monomers having mutually reactive functional groups, such as glycidyl methacrylate and methacrylic acid, or by copolymerizing an auto-reactive monomer, such as N-alkoxymethylated acrylamides, and γ-methacryloyloxypropyl trimethoxy silanes.

In conducting the dispersion polymerization, the ratio of the dispersion stabilizer to the vinyl monomer forming dispersed particles is selected from the range of about 5/95 to about 80/20 by weight, preferably about 10/90 to about 60/40 by weight, and the dispersion polymerization can be conducted in the presence of a radical polymerization initiator by a known procedure.

While the particle size of the resulting non-aqueous dispersion type acrylic resin is generally in the range of about 0.05 μm to about 2 μm, the range of about 0.1 μm to about 0.7 μm is preferable from the stability of shelf life and the gloss, smoothness and weatherability of the film.

To improve weatherability of the coating, 0.1–5 weight percent, preferably 1 to 2.5 weight percent and more preferably 1.5 to 2 weight percent, based on the weight of the total weight of the polyester, polyisocyanate and melamine components, of an ultraviolet light stabilizer or a combination of ultraviolet light stabilizers can be added. These stabilizers include ultraviolet light absorbers and hindered amine light stabilizers.

Typical ultraviolet light stabilizers that are useful are as follows:

Benzophenones, such as hydroxydodecylbenzophenone, 2,4-dihydroxybenzophenone, hydroxybenzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2', 4'trihydroxy-4'-alkoxy-benzophenone, 2-hydroxy-4-methoxy-2'-carboxybenzophenone.

Triazoles, such as 2-phenyl-4-(2',4'-dihydroxybenzoyl) triazoles, substituted benzotriazoles, such as hydroxyphenyltriazoles including 2-(2'hydroxy-5'-methylphenyl) benzotriazole, 2-(2'hydroxyphenyl) benotriazole, 2-(2'hydroxy-5'-octylphenyl) naphthotriazole.

Triazines, such as 3,5-dialkyl-4-hydroxyphenyl derivatives of triazine, sulfur-containing derivatives of dialkyl-4-hydroxyphenyltriazines, hydroxyphenyl-1,3,5-triazines and triazines containing sulfonic acid groups, such as aryl-1,3, 5-triazines, orthohydroxyaryl-s-triazine.

Benzoates, such as dibenzoate of diphenylopropane, t-butyl benzoate of diphenylopropane, nonyl phenyl benzoate, octyl phenyl benzoate, resorcinol dibenzoate.

Other ultraviolet light stabilizers that can be used include lower alkyl thiomethylene-containing phenols, substituted benzenes, such as 1,3-bis(2'-hydroxybenzoyl) benzene, metal derivatives of 3,5'-di-t-butyl 4-hydroxyphenylpropionic acid, asymmetrical oxalic acid diarylamides, alkylhdroxyphenylthioalkanoic acid esters, dialkylhydroxyphenylalkanoic acid esters of di- and tri-pentaerythritol, phenyl- and naphthlene-substituted oxalic acid diamides, methyl-.beta.-(3,5-di-t-butyl-4-hydroxyphenyl) propionate, $\alpha$, $\alpha'$-bis(2 hydroxy-phenyl) diisopropylbenzene, 3,5'-dibromo-2'-hydroxyacetophenone, ester derivatives of 4,4-bis(4'-hydroxy-phenyl) pentaonic acid wherein there is at least one unsubstituted position ortho to the aromatic hydroxyl groups, organophosphorus sulfides such as bis(diphenylphosphinothioyl) monosulfide and bis(diphenyl-phosphinothioyl) dislufide, 4-benzoyl-6-(dialkylhydroxybenzyl) resorcinol, bis(3-hydroxy-4-benzoylphenoxy) diphenylsilane, bis(3-hydroxy-4-benzoylphenoxy) dialkylsilane, 1,8-naphthalimides, $\alpha$-cyano $\beta$, $\beta$-diphenylacrylic acid derivatives, bis(2-benzoxazoly) alkanes, methylene malonitriles containing aryl and heteroacyclic substitutes, alkylene bis (dithio) carbarnate, 4-benzoyl-3-hydroxy-phenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyl-3-dodecyl-7,7,9,9-tetramethyl- 1,3,8-triazasprio (4,5) decanol-2,4-dione.

Particularly useful ultraviolet light stabilizers that can be used are hindered amines of piperidyl derivatives, such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[phenyldithiocarbamato]-Ni(II), and others listed in the above patent, column 8, line 44 through line 55.

In use, the first-pack of the two-pack coating composition containing the polyisocyanate and the second-pack containing the melamine and polyester polyol component are mixed just prior to use or about 5 to 30 minutes before use to form a pot mix, which has limited pot life of about 10 minutes to about 6 hours. Thereafter, it becomes too viscous to permit application through conventional application systems, such as spraying. A layer of the pot mix is typically applied to a substrate by conventional techniques, such as spraying, electrostatic spraying, roller coating, dipping or brushing. Generally, a clear coat layer having a thickness in the range of from 25 micrometers to 75 micrometers is applied over a metal substrate, such as automotive body, which is often pre-coated with other coating layers, such as an electrocoat, primer and a basecoat. The two pack coating composition may be baked upon application for about 60 to 10 minutes at about 80° C. to 160° C.

When the one-pack coating composition containing the blocked polyisocyanate is used, a layer thereof applied over a substrate using aforedescribed application techniques, is cured at a baking temperature in the range of from 80° C. to 200° C., preferably in the range of 80° C. to 160° C., for about 60 to 10 minutes. It is understood that actual baking temperature would vary depending upon the catalyst and the amount thereof, thickness of the layer being cured and the blocked isocyanate functionalities and the melamine utilized in the coating composition. The use of the foregoing baking step is particularly useful under OEM (Original Equipment Manufacture) conditions.

If desired, the composition can be pigmented to form a colored finish or primer. About 0.1–200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

The clear coating composition of the present invention is suitable for providing clear coatings on variety of substrates, such as metal, wood and concrete substrates. The present composition is especially suitable for providing clear coatings in automotive OEM or refinish applications typically used in coating autobodies. These compositions are also suitable as clear coatings in industrial and maintenance coating applications.

The invention is illustrated in the following Examples:

EXAMPLES

Polyester Polyol A

This was the reaction product of trimethylol propane, methyl hexahydrophthalic anhydride and ethylene oxide. The ingredients are shown in Table 1 below. The PGMEA, TMP and TEA were charged to a vessel rated for high pressure and heated to 140° C. The MHHPA was added to the reactor over one hour and then the batch was held at 140° C. for six hours. Thereafter the batch was cooled to 25° C. The vessel was sealed and the EO was added. The batch was heated to 110° C. and held for six hours. The excess EO was purged from the reactor with nitrogen. The material had a Gardner Holdt viscosity of F and solids at 64.3%. The acid number was 10. The batch was then stripped to 85% solids.

TABLE 1

| | | |
|---|---|---|
| TMP | Trimethylol propane | 134 grams |
| PGMEA | Propylene glycol monomethyl ether acetate | 565 grams |
| MHHPA[1] | Methyl hexahydrophthalic anhydride | 491 grams |
| TEA | Triethylamine | 0.23 grams |
| EO | Ethylene Oxide | 198 grams |

[1]Milldride ® anhydride supplied by Milliken Chemical

Polyester Polyol B

This was the reaction product of TMMP, MHHPA and glycidyl ester The ingredient amounts are shown in Table 2 below.

The TMP and PGMEA (propylene glycol monomethyl ether acetate) were charged to a four-neck flask fitted with a condenser, stirrer, dropping funnel and thermometer. The batch was heated to reflux (approx. 145° C.). The MHHPA was added dropwise, evenly, over 60 minutes. The reaction was then continued at reflux for four hours. The reaction was then reduced to 120° C., the DMEA was added and then the Cardura®E glycidyl ester was added evenly over 60 minutes. The reaction temperature was raised to 140° C. and held until an acid number of less than 4 was achieved. The resultant product had a viscosity of Z on the Gardner Holdt scale and percent solids of 80%.

TABLE 2

| | | |
|---|---|---|
| TMP | Trimethylol propane | 268 grams |
| PGMEA | Propylene glycol monomethyl ether acetate | 690 grams |
| MHHPA[1] | Methyl hexahydrophthalic anhydride | 974 grams |
| DMEA | Dimethylethanol amine | 0.4 grams |
| Cardura ®E | Glycidyl ester of C9 aliphatic acid | 1520 grams |

[1]Milldride ® anhydride supplied by Milliken Chemical

The following examples along with comparative examples describe the clearcoat composition of the present invention as well as the properties of clearcoats obtained therefrom when sprayed over basecoats and cured.

The components of part A in each Example were well mixed, combined with Part B material (polyisocyanate) and then sprayed over basecoat within thirty minutes of mixing. The basecoat was a commercial waterborne black basecoat sprayed to give 15.2 micrometer (0.6 mils) of film thickness. The basecoat was prebaked for 10 minutes at 82° C. (180° F.). The clearcoats were sprayed to give 51±5.1 micrometers (2.0±0.2 mils) of film thickness and then baked for thirty minutes at 141° C. (285° F.).

The examples show variation of the three components (polyester polyol, melamine resin and polyisocyanate) in amounts and type.

Comparative Example 1 and Examples 2 to 4

TABLE 3

|  | Comparative 1 | Examples | | |
|---|---|---|---|---|
|  |  | 2 | 3 | 4 |
| Ratio (Polyol/Mel/Iso) Part A | 15/20/65 | 25/20/55 | 35/20/45 | 45/20/35 |
| Polyester Polyol A[1] | 17.6 | 29.4 | 41.2 | 52.9 |
| Cymel ® 1158 melamine[3] | 25.0 | 25.0 | 250 | 25.0 |
| Tinuvin ® 928 UV absorber[4] | 2.0 | 2.0 | 2.0 | 2.0 |
| Tinuvin ® 152 light stabilizer[4] | 1.0 | 1.0 | 1.0 | 1.0 |
| 10% Byk ® 301 flowcontrol additive[5] | 1.0 | 1.0 | 1.0 | 1.0 |
| 10% catalyst[7] | 0.5 | 0.5 | 0.5 | 0.5 |
| Phenyl Acid Phosphate (catalyst) | 0.7 | 0.7 | 0.7 | 0.7 |
| Ethoxyethyl Propionate solvent | 8.0 | 12.0 | 12.0 | 12.0 |
| Solvesso 100 solvent |  |  | 3.0 | 6.0 |
| Part B |  |  |  |  |
| 83% polyisocyanate[8] | 78.3 | 66.3 | 54.2 | 45.2 |
| Viscosity (Part A) in seconds[9] | 58 | 60 | 55 | 51 |
| Tukon Hardness (ASTM D1474) | 5.6 | 12.2 | 13.5 | 15.7 |
| Crockmeter Mar[10] | 78 | 85 | 78 | 82 |
| Etch Resistance[11] | 0 | −4 | −6 | −3 |
|  | Equal | Slightly better | Slightly better | Equal |

Examples 5 and 6

TABLE 4

|  | Example | |
|---|---|---|
|  | 5 | 6 |
| Ratio (Polyol/Mel/Iso) Part A | 40/30/30 | 20/30/50 |
| Polyester Polyol B[2] | 51.0 | 25.5 |
| Cymel ® 1158 melamine[3] | 37.5 | 37.5 |
| Tinuvin ® 928 UV absorber[4] | 2.0 | 2.0 |
| Tinuvin ® 152 light stabilizer[4] | 1.0 | 1.0 |
| Polybutyl Acrylate[6] | 0.5 | 0.5 |
| 10% catalyst[7] | 0.5 | 0.5 |
| Phenyl Acid Phosphate (catalyst) | 0.7 | 0.7 |
| Ethoxyethyl Propionate (solvent) | 10.0 | 10.0 |
| Solvesso 100 solvent | 6.0 | 5.0 |

TABLE 4-continued

|  | Example | |
|---|---|---|
|  | 5 | 6 |
| Part B |  |  |
| 83% polyisocyanate[8] | 36.1 | 42.2 |
| Viscosity (Part A) in seconds[9] | 60 | 60 |
| Tukon Hardness (ASTM D1474) | 12.7 | 10.4 |
| Crockmeter Mar[10] | 86 | 83 |
| Etch Resistance[11] | −10 better | −10 Better |

Notes for Tables 4 and 4 above and Table 5 below
[1]Polyester polyol A described earlier
[2]Polyester polyol B described earlier
[3]A product of Cytec Industries, Inc., Stamford, Connecticut
[4]A product of Ciba Specialty Chemicals Corp., Tarrytown, NY.
[5]A product of BYK-Chemie USA, Wallingford, Connecticut
[6]A polymer of butyl acrylate at 60% solids in xylene, Mw = 8400
[7]10% solution of dibutyl tin dilaurate in ethoxyethylpropionate (EEP)
[8]An 83% solution of Tolonate ®HDT-LV, a product of Rhodia, Cranbury New Jersey
[9]#4 Ford cup
[10]Crockmeter - Dry Mar Resistance- Panels, which have cured clearcoat over black basecoats were coated with a thin layer of Bon Ami abrasive supplied by Faultless Starch/Bon Ami Corporation, Kansas City, Missouri. The clear coats had a dry coating thickness of 50 microns. The panels were then tested for mar damage for 10 double rubsagainst a green felt wrapped fingertip of A.A.T.C.C. Crockmeter (Model CM-1, Atlas Electric Devices Corporation, Chicago, Illinois). The dry mar resistance was recorded as percentage of gloss retention by measuring the 20° gloss of the marred areas versus non-marred areas of the coated panels.
[11]Damage caused by spots of a pH 1 solution applied to a panel resting on a gradient oven. The spots are applied at 5° C. intervals from 40° C. to 85° C. for 30 minutes. The degree of damage is compared to a commercial two component urethane automotive clearcoat. Negative numbers mean less damage vs. control. Higher the negative numberbetter the etch resistance against the standard. Deviation of four units from the standard is considered significant.

The following are considered to be acceptable coating properties: A coating composition viscosity of 80 seconds and lower, Tukon hardness of the resultant coating of 7.5 and higher, and a Crockmeter mar reading of the resultant coating of 75 and higher.

From the foregoing Examples it can be seen that when more than 50 weight percent of polyisocyanate is used in a coating composition (Comparative Example 1) the coating hardness suffers. As the amount of polyester polyol is increased, the coating composition viscosity drops without substantially affecting other properties (Examples 2, 3 and 4). As the amount of polyisocyanate is increased, etch resistance is improved (Example 5 and 6).

Comparative Examples

Comparative Examples 7 and 8 illustrate how the coating properties are affected when one of the essential (polyester polyol, melamine, and polyisocyanate) components of the present invention is absent. In Comparative Example 7, there is no melamine resin. The coating resulting therefrom had only marginal etch resistance and the mar resistance was very poor. In Comparative Example 8, there was no polyisocvanate. In this case, the mar resistance was good, but the etch resistance was poor. Thus, it is seen that the applicants have unexpectedly discovered that it is the combination of these components present in the high solids low VOC coating composition that provides good etch and mar resistance, while still having desired application viscosities.

TABLE 5

| | Comparative Examples | |
|---|---|---|
| | 7 | 8 |
| Ratio (Polyol/Mel/Iso) | 58/0/42 | 65/35/0 |
| Part A | | |
| Polyester Polyol A[1] | 68.2 | 76.5 |
| Cymel ® 303 melamine[3] | | 35.0 |
| Tinuvin ® 928 UV absorber[4] | 2.0 | 2.0 |
| Tinuvin ® 152 light stabilizer[4] | 1.0 | 1.0 |
| Polybutyl Acrylate[6] | 0.5 | 0.5 |
| Dodecylbenzene sulfonic acid | | 1.3 |
| Phenyl Acid Phosphate (catalyst) | 0.7 | |
| Ethoxyethyl Propionate (solvent) | 12.0 | 12.0 |
| Solvesso 100 solvent | 6.0 | 15.0 |
| | 90.4 | 141.3 |
| Part B | | |
| 83% polyisocyanate[8] | 50.6 | |
| Viscosity (Part A) in seconds[9] | 52 | 60 |
| Tukon Hardness (ASTM D1474) | 12.3 | 14.5 |
| Crockmeter Mar[10] | 24 | 85 |
| Etch Resistance[11] | 0 equal | +10 Poor |

What is claimed is:

1. A clear coating composition comprising a polyester polyol, a polyisocyanate component and a melamine component wherein the total amount of said polyisocyanate and melamine components range from 50 percent to 90 percent, said percentages being in weight percentage based on the total weight of composition solids provided neither said polyisocyanate component nor said melamine component is more than about half of said total weight of composition solids and wherein said polyisocyanate component comprises an aliphatic polyisocyanate having on an average 2 to 6 isocyanate functionalities, wherein said isocyanate functionalities are unblocked or blocked by reacting with a monomeric alcohol.

2. The composition of claim 1 wherein said monomeric alcohol is an aliphatic alcohol.

3. The composition of claim 1 wherein said polyester polyol component comprises at least one hydroxyl polyester having in the range of 2.5 to 6 hydroxy functionalities and a weight average molecular weight of less than 3000.

4. The composition of claim 1 wherein said composition further comprises one or more organo tin or acid catalysts.

5. The composition of claim 4 wherein said organo tin catalyst is selected from the group consisting of dibutyl tin diacetate, dibutyl tin dilaurate, stannous octate, and a combination thereof.

6. The composition of claim 4 wherein the acid catalyst is selected from the group consisting of dodecylbenzene sulfonic acid, dodecylbenzene sulfonic acid blocked with an amine, para-toluenesulfonic acid, para-toluenesulfonic acid blocked with said amine, phenyl acid phosphate, phenyl acid phosphate blocked with said amine, dinonylnaphthalene sulfonic acid, dinonylnaphthalene sulfonic acid blocked with said amine and a combination thereof.

7. The composition of claim 6 wherein said amine is selected from the group consisting of dimethyl oxazolidine, 2-amino-2-methyl-1-propanol, n,n-dimethylethanolamine and a combination thereof.

8. The composition of claim 4, 5, or 6 wherein said composition comprises in the range of from 0.001 percent to 5.0 percent of said catalyst, all percentages being weight percentages based on the total weight of polyester polyol, polyisocyanate and melamine components.

9. The composition of claim 1 wherein said polyisocyanate component is selected from the group consisting of one or more trimers of hexamethylene diisocyanate, isophorone diisocyanate, meta-tetramethylxylylene diisocyanate, and a combination thereof.

10. The composition of claim 1 or 5 comprises in the range of from 25 percent to 55 percent said polyisocyanate component wherein all percentages are in weight based on the total weight of composition solids.

11. The composition of claim 1, 2 or 9 wherein said polyisocyanate component has an average of 2.5 to 6 isocyanate functionalities.

12. The composition of claim 1 wherein said melamine component is selected from the group consisting of a monomeric melamine, a polymeric melamine, and a combination thereof.

13. The composition of claim 1 or 12 comprises in the range of from 10 percent to 40 percent of said melamine component wherein all percentages are in weight based on the total weight of composition solids.

14. The composition of claim 1 further comprises a flow modifying resin having a weight average molecular weight in the range of 20,000 to 100,000.

15. The composition of claim 1 comprises in the range of from 5 percent to 65 percent of said polyester polyol component, all percentages being in weight percentages based on the total weight of composition solids.

16. The composition of claim 1 in the form of a two-pack composition wherein a first-pack of said two-pack composition comprises said melamine and said polyester polyol component and a second-pack of said two-pack composition comprises said polyisocyanate component.

17. The composition of claim 1 wherein a volatile organic component of said composition varies in the range of from 0.0 to 0.472 kilogram of an organic solvent per liter of the composition.

18. The clear coating composition of claim 1 wherein a clear coating on a substrate produced from said composition has a distinctness of image rating of at least 80.

19. The composition of claim 1 further comprises components selected from the group consisting of ultra violet light stabilizers, light absorbers and a combination thereof.

20. A method of producing a clear coating on a substrate comprising:
applying a layer of a clear coating composition comprising a polyester polyol, a polyisocyanate component and a melamine component wherein the total amount of said polyisocyanate and melamine components range from 50 percent to 90 percent, said percentages being in weight percentage based on the total weight of composition solids provided neither said polyisocyanate component nor said melamine component is more than about half of said total weight of composition solids and wherein said polyisocyanate component comprises an aliphatic polyisocyanate having on an average 2 to 6 isocyanate functionalities, wherein said isocyanate functionalities are unblocked or blocked by reacting with a monomeric alcohol; and
curing said layer into said clear coating.

21. The method of claim 20 wherein said coating has a distinctness of image rating of at least 80.

22. The method of claim 21 wherein said coating has a 20° gloss of at least 80.

23. The method of claim 22 wherein said isocyanate functionalities of the polyisocyanate are blocked by reacting said polyisocyanate with a monomeric alcohol.

24. The method of claim 23 wherein said monomeric alcohol is selected from the group consisting of cyclohexanol, 2-ethyl hexanol and a mixture thereof.

25. The method of claim 23 or 24 wherein said curing of said layer takes place at an elevated baking temperature in the range 80° C. to 160° C.

26. The method of claim 22 wherein said composition comprises in the range of from 5 percent to 65 percent of said polyester polyol component, all percentages being in weight percentages based on the total weight of composition solids.

* * * * *